(12) United States Patent
Wuthrich et al.

(10) Patent No.: US 7,640,735 B2
(45) Date of Patent: Jan. 5, 2010

(54) AUXILIARY PUMP FOR HYDROSTATIC TRANSMISSION

(75) Inventors: Jerome B. Wuthrich, Moundridge, KS (US); Xingen Dong, Greeneville, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 287 days.

(21) Appl. No.: 11/533,121

(22) Filed: Sep. 19, 2006

(65) Prior Publication Data

US 2007/0062186 A1     Mar. 22, 2007

Related U.S. Application Data

(60) Provisional application No. 60/718,464, filed on Sep. 19, 2005.

(51) Int. Cl.
*F16D 31/02* (2006.01)

(52) U.S. Cl. .................. 60/468; 60/488; 137/614.17

(58) Field of Classification Search ............ 60/468, 60/488; 137/614.14, 614.17, 614.18
See application file for complete search history.

(56) References Cited

U.S. PATENT DOCUMENTS

| | | | | |
|---|---|---|---|---|
| 2,588,527 A | * | 3/1952 | Holmes | 137/529 |
| 2,761,389 A | * | 9/1956 | Turner | 137/614.14 |
| 4,570,849 A | * | 2/1986 | Klaucke et al. | 91/452 |
| 5,555,727 A | * | 9/1996 | Hauser et al. | 60/488 |

\* cited by examiner

*Primary Examiner*—F. Daniel Lopez
(74) *Attorney, Agent, or Firm*—Renner, Otto, Boisselle & Sklar, LLP

(57) ABSTRACT

An auxiliary pump assembly for a hydrostatic transmission that operates at a reduced pressure when the auxiliary circuit is not in use, and operates at an increased pressure when the auxiliary circuit is in use, thereby reducing the heat generated by the auxiliary pump. The auxiliary pump assembly can be used to supply low pressure makeup flow to a closed loop of a hydrostatic transmission. A combination valve including a bypass valve and a relief valve is also provided.

15 Claims, 8 Drawing Sheets

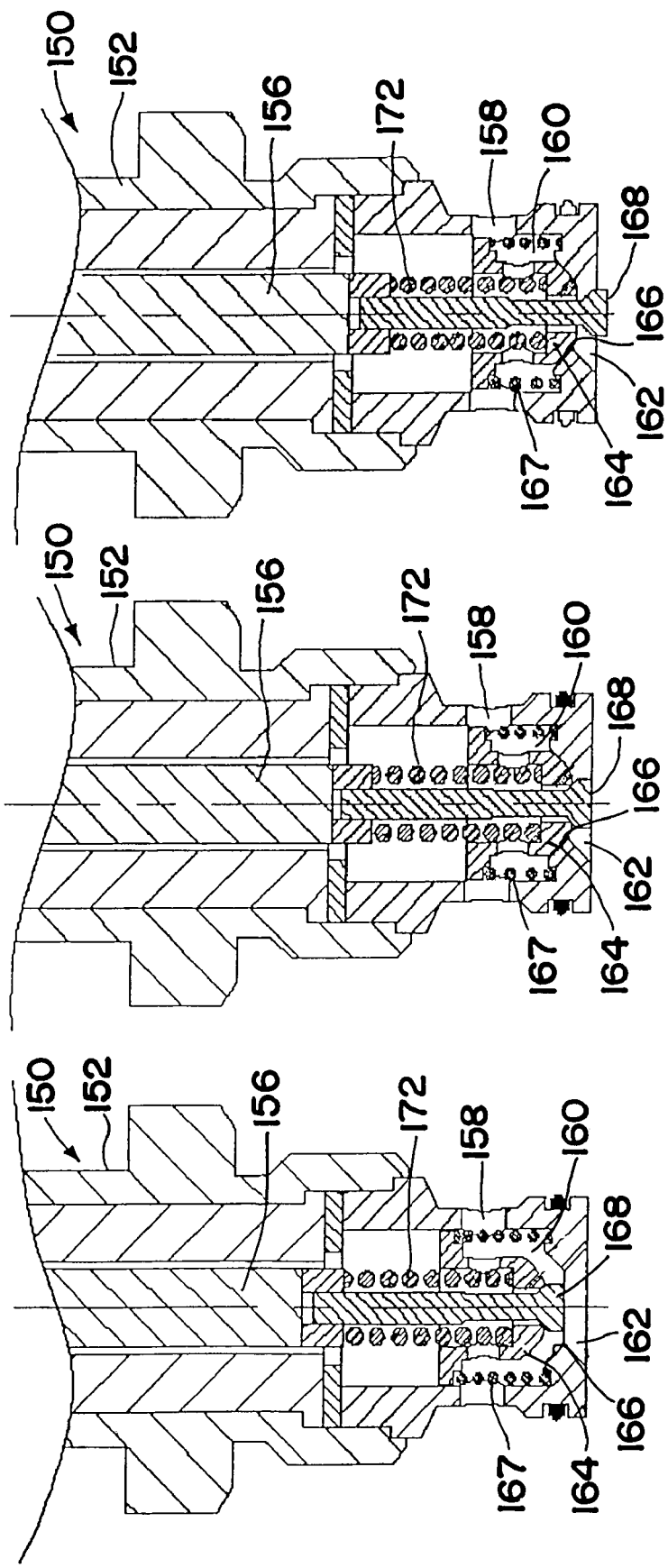

AUXILIARY PUMP FOR HYDROSTATIC TRANSMISSION

RELATED APPLICATIONS

This application hereby incorporates by reference and claims the benefit of U.S. Provisional Application No. 60/718,464 filed Sep. 19, 2005.

FIELD OF THE INVENTION

The present invention relates generally to hydrostatic transmissions. More particularly, the invention relates to hydrostatic transmissions for use in vehicles, such as mowing machines.

BACKGROUND OF THE INVENTION

Hydrostatic transmissions have many uses, including the propelling of vehicles, such as mowing machines, and offer a stepless control of the machine's speed. A typical hydrostatic transmission system includes a variable displacement main hydraulic pump connected in a closed hydraulic circuit with a fixed displacement hydraulic motor. The closed hydraulic circuit includes a first conduit connecting the main pump outlet with the motor inlet and a second conduit connecting the motor outlet with a pump inlet. Either of these conduits may be the high pressure line depending upon the direction of pump displacement from neutral. For most applications, the pump is driven by a prime mover, such as an internal combustion engine or an electrical motor, at a certain speed in a certain direction. Many hydrostatic transmissions also include a charge pump for providing makeup flow to the closed circuit to replace fluid lost due to internal leakage. Charge pumps are typically positive displacement pumps (e.g., a gear pump) driven by the same input as the main hydraulic pump and provide fluid to the closed circuit via one or more check valves. Changing the displacement of the main pump will change its output flow rate, which controls the speed of the motor. Pump outflow can be reversed, thus reversing the direction of the motor. In a vehicle, the motor is typically connected through suitable gearing to the vehicle's wheels or tracks.

In many applications, fluid from the hydrostatic transmission is used to operate one or more auxiliary hydraulic circuits, for example, to raise and/or lower an implement such as a mower deck. Such auxiliary circuits, though used relatively seldom, often require relatively high pressure to operate properly. Thus, a readily available high pressure fluid source is needed to power the auxiliary circuit.

One solution has been to provide a hydrostatic transmission with an auxiliary pump capable of providing sufficient pressurized fluid to operate the auxiliary circuit. In some applications, the auxiliary pump is provided in place of a charge pump and is used to supply fluid not only to the auxiliary circuit, but also to provide makeup flow to the closed loop of the hydrostatic transmission. Due to the high pressure required by the auxiliary circuit and the infrequent use of the same, such an arrangement generates significant heat as the auxiliary pump continuously pressurizes fluid. Accordingly, such systems often require an additional fluid cooler for dissipating the generated heat.

SUMMARY OF THE INVENTION

The present invention provides an auxiliary pump assembly for a hydrostatic transmission that operates at a reduced pressure when the auxiliary circuit is not in use, and operates at an increased pressure when the auxiliary circuit is in use, thereby reducing the heat generated by the auxiliary pump. The auxiliary pump assembly can be used to supply low pressure makeup flow to a closed loop of a hydrostatic transmission.

Accordingly, the invention provides an auxiliary hydraulic pump assembly for a hydrostatic transmission system for a vehicle comprising an auxiliary hydraulic pump having an inlet and an outlet, a pump discharge line connectable to an actuator for supplying fluid from the outlet of the pump to the actuator, and a low pressure relief valve connected in series with a selectively actuated flow control device between the outlet of the pump and the inlet of the pump, the low pressure relief valve allowing fluid to pass therethrough that is at a pressure exceeding a first pressure level. The flow control device, in a first mode of operation, permits flow from the pump outlet to the low pressure relief valve when the pressure of the fluid at the outlet exceeds a second pressure level greater than the first pressure level and blocks flow when the pressure of the fluid at the outlet is no greater than the first level such that pressurized fluid at the outlet of the auxiliary pump can be supplied to the pump discharge line up to the second pressure level. In a second mode the flow control device connects the pump outlet to the low pressure relief valve regardless of fluid pressure at the outlet of the auxiliary pump, whereby pressure at the outlet of the pump will be limited by the low pressure relief valve in such second mode of the flow control device and allow higher pressure fluid in the pump discharge line to flow through the low pressure relief valve.

In an exemplary embodiment, the flow control device comprises a high pressure relief valve and a bypass valve connected in parallel between the outlet of the pump and the low pressure relief valve, whereby when the bypass valve is closed the flow control device permits flow from the pump outlet to the low pressure relief valve when pressure of the fluid at the outlet exceeds a second pressure level greater than the first pressure level and blocks flow when the pressure of the fluid at the outlet is no greater than the second level, whereby pressurized fluid at the outlet of the auxiliary pump can be supplied to the pump discharge line up to the second level, and when the bypass valve is open the flow control device connects the pump outlet to the low pressure relief valve regardless of fluid pressure whereby pressure at the outlet of the pump will be limited by the low pressure relief valve in such second mode of the flow control device and allow higher pressure fluid in the pump discharge line to flow through the low pressure relief valve. The low pressure relief valve can be connectable to a charge line for providing makeup flow to a hydrostatic transmission. The flow control device can be a relief valve that can be selectively opened whereby when the relief valve is selectively opened fluid can flow from the outlet of the pump to the low pressure relief valve regardless of fluid pressure. The flow control device can be adjacent the auxiliary pump, integral with the auxiliary pump, or located within the confines of an auxiliary pump housing.

According to another aspect of the invention, a hydrostatic transmission system for a vehicle comprises a pump, a motor, supply and return lines connecting the pump and motor in a closed circuit, and the auxiliary pump assembly as set forth above, wherein an outlet of the flow control device of the auxiliary hydraulic pump assembly is connected to a charge line of the hydrostatic transmission for providing makeup flow to the closed circuit. The flow control device can be located within the confines of a housing of the hydrostatic transmission.

According to another aspect of the invention, a valve for use as the flow control device in an auxiliary hydraulic circuit of a hydrostatic transmission comprises a valve body having an inlet and an outlet connected by an interior passage, a bypass valve member supported in the valve body for axial movement between open and closed positions respectively permitting and blocking flow of a fluid through the interior bore, and a relief valve member for permitting flow between the inlet and outlet via a relief passage in response to fluid pressure at the inlet exceeding a prescribed amount. In an exemplary embodiment, the relief valve member is supported by and forms a part of the bypass valve member and a flow passageway including an orifice is provided for connecting the inlet to the outlet for permitting a minimum flow between the inlet and the outlet regardless of the position of the bypass valve member or relief valve member. The orifice can be formed integrally with at least one of the bypass vale member and relief valve member.

According to yet another aspect of the invention, a method of operating an auxiliary pump assembly for controlling an auxiliary component of a vehicle comprises the steps of switching a flow control device to operate in a first mode that permits flow from a pump outlet to a low pressure relief valve when pressure of the fluid at the outlet exceeds a prescribed pressure level and blocks flow when the pressure of the fluid at the outlet is no greater than the prescribed level, whereby pressurized fluid at the outlet of the pump can be supplied to a pump discharge line up to the prescribed level, and switching the flow control device to operate in a second mode that connects the pump outlet to the low pressure relief valve regardless of fluid pressure at the outlet of the auxiliary pump, whereby pressure at the outlet of the pump will be limited by the low pressure relief valve in such second mode of the flow control device and allow higher pressure fluid in the pump discharge line to flow through the low pressure relief valve.

Further features of the invention will become apparent from the following detailed description when considered in conjunction with the drawings.

BRIEF DESCRIPTION OF THE DRAWINGS

FIG. 7 is a cross-sectional view of the valve of FIG. 6 in a bypass open configuration.

FIG. 8 is a cross-sectional view of the valve of FIG. 6 in a bypass closed configuration with the pressure relief valve closed.

FIG. 9 is a cross-sectional view of the valve of FIG. 6 in a bypass closed configuration with the pressure relief valve open.

DETAILED DESCRIPTION

Figure 1:
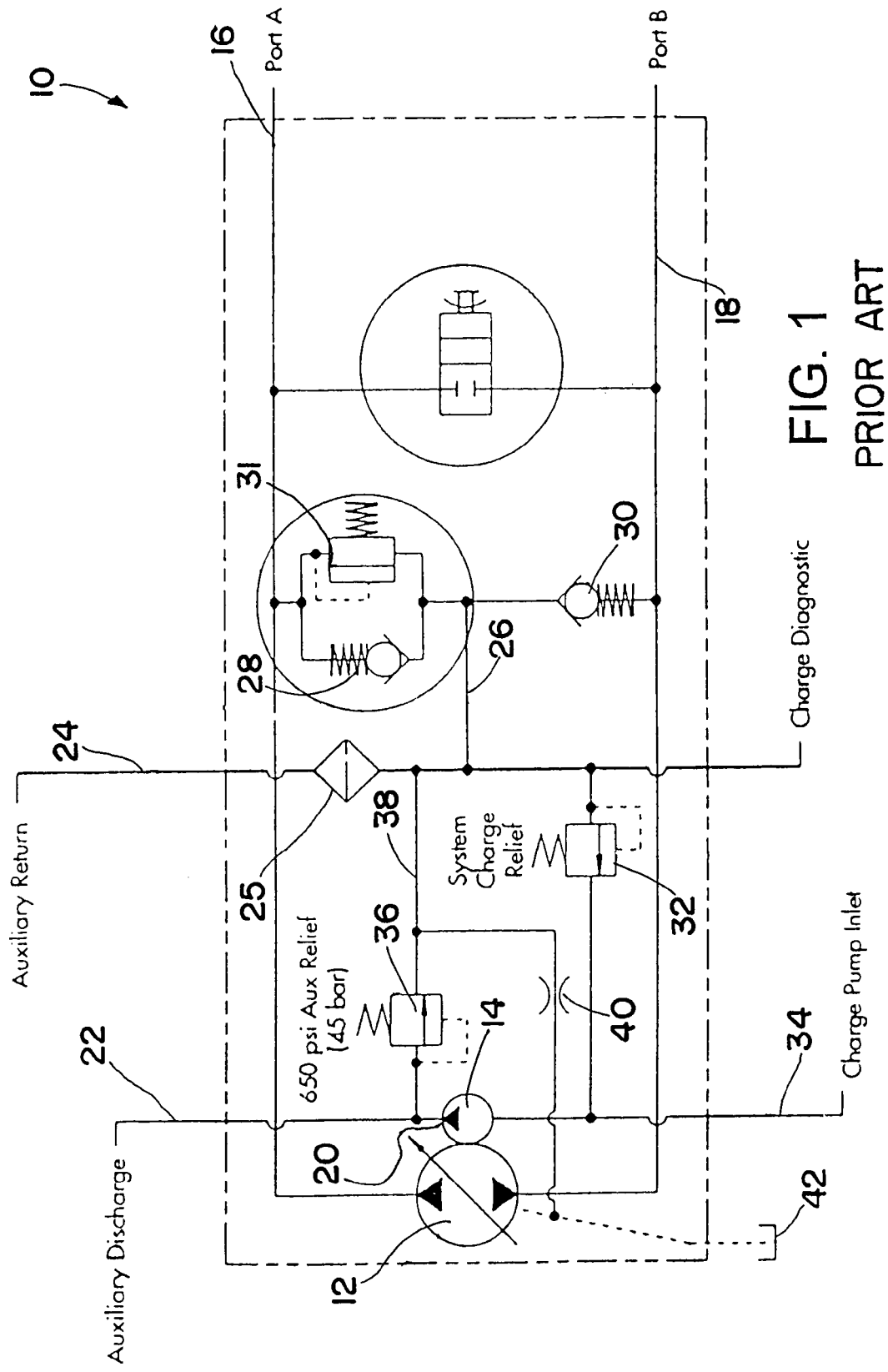
FIG. 1 is a schematic diagram illustrating a portion of a prior art hydraulic transmission.

Referring now to the drawings in detail, and initially to FIG. 1, a schematic diagram is shown illustrating a portion of a fluid circuit 10 of a known hydrostatic transmission. The fluid circuit 10 includes a main pump 12 and an auxiliary pump 14. The main pump 12 is connected by line 16 to port A and by line 18 to port B for supplying and returning hydraulic fluid to a hydraulic motor (not shown). The auxiliary pump 14 includes an outlet 20 connected to discharge line 22 for supplying fluid from the outlet of the auxiliary pump 14 to an auxiliary actuator (not shown) to which the discharge line 22 is connectable. A return line 24 returns fluid from the auxiliary actuator. The return line 24 includes a filter 25 and is connected via charge line 26 to check valves 28 and 30 for supplying makeup flow to lines 16 and 18 in a conventional manner. A pressure relief valve 31 is provided for relieving pressure from the closed loop. Return line 24 is also connected to a charge relief valve 32 which in turn is connected to an auxiliary pump input line 34 for returning fluid to auxiliary pump 14.

The outlet 20 of the auxiliary pump 14, in addition to being connected to discharge line 22, is connected to a high pressure auxiliary circuit relief valve 36 that allows fluid to bypass the auxiliary actuator when the pressure in discharge line 22 exceeds a certain amount, such as 650 psi. Fluid that flows through the high pressure auxiliary relief valve 36 flows via line 38 to the auxiliary return line 24 and subsequently through check valves 28 and/or 30 into lines 16 and 18 or via charge relief valve 32 back to the auxiliary pump inlet line 34. A flow restricting orifice 40 connects line 38 to sump 42.

In operation, main pump 12 and auxiliary pump 14 are driven together, typically by the same input shaft (not shown). Depending on the direction of operation of the main pump 12, fluid is supplied via line 16 or line 18 to port A or port B, respectively, and returned via the opposite port and line. Accordingly, main pump 12 lines 16 and 18 and the motor (not shown) define a closed loop hydraulic circuit.

The auxiliary pump 14 supplies fluid to the auxiliary discharge line 22 via the outlet 20 of the pump 14. Accordingly, when the auxiliary actuator is not in operation and, therefore, fluid is not flowing from the discharge line 22 to the return line 24, fluid pressure builds in discharge line 22 to a maximum of 650 psi at which point the auxiliary relief valve 36 opens thereby allowing fluid to flow into line 38 and subsequently through check valves 28 and/or 30 as makeup flow, through charge relief valve 32 back to the auxiliary pump inlet line 34, and/or through restricting orifice 40 to sump 42.

When the auxiliary actuator is activated fluid flows through discharge line 22 and returns via auxiliary return line 24. The auxiliary relief valve 36 will typically remain closed during operation of the auxiliary actuator unless the pressure in the pump discharge line 22 exceeds a prescribed level. Fluid returning via line 24 is then subsequently routed through check valves 28 and/or 30 as makeup flow, charge relief valve 32, and/or restricting orifice 40 to the sump 42.

The illustrated auxiliary pump 14, therefore, provides fluid to the auxiliary actuator when in operation and provides makeup flow to lines 16 or 18 via fluid that travels from discharge line 22 through the auxiliary actuator and returns via line 24, or in the case when the auxiliary actuator is not in use, the auxiliary pump 14 provides makeup flow to lines 16 and 18 via the high pressure auxiliary relief valve 36. Because the auxiliary actuator is typically used intermittently, during a substantial portion of the operation the auxiliary pump 14 the fluid is pressurized to 650 psi even though such high pressure is not necessary. As indicated above, this will heat the fluid and may require the use of a cooler to cool the fluid.

Figure 2:
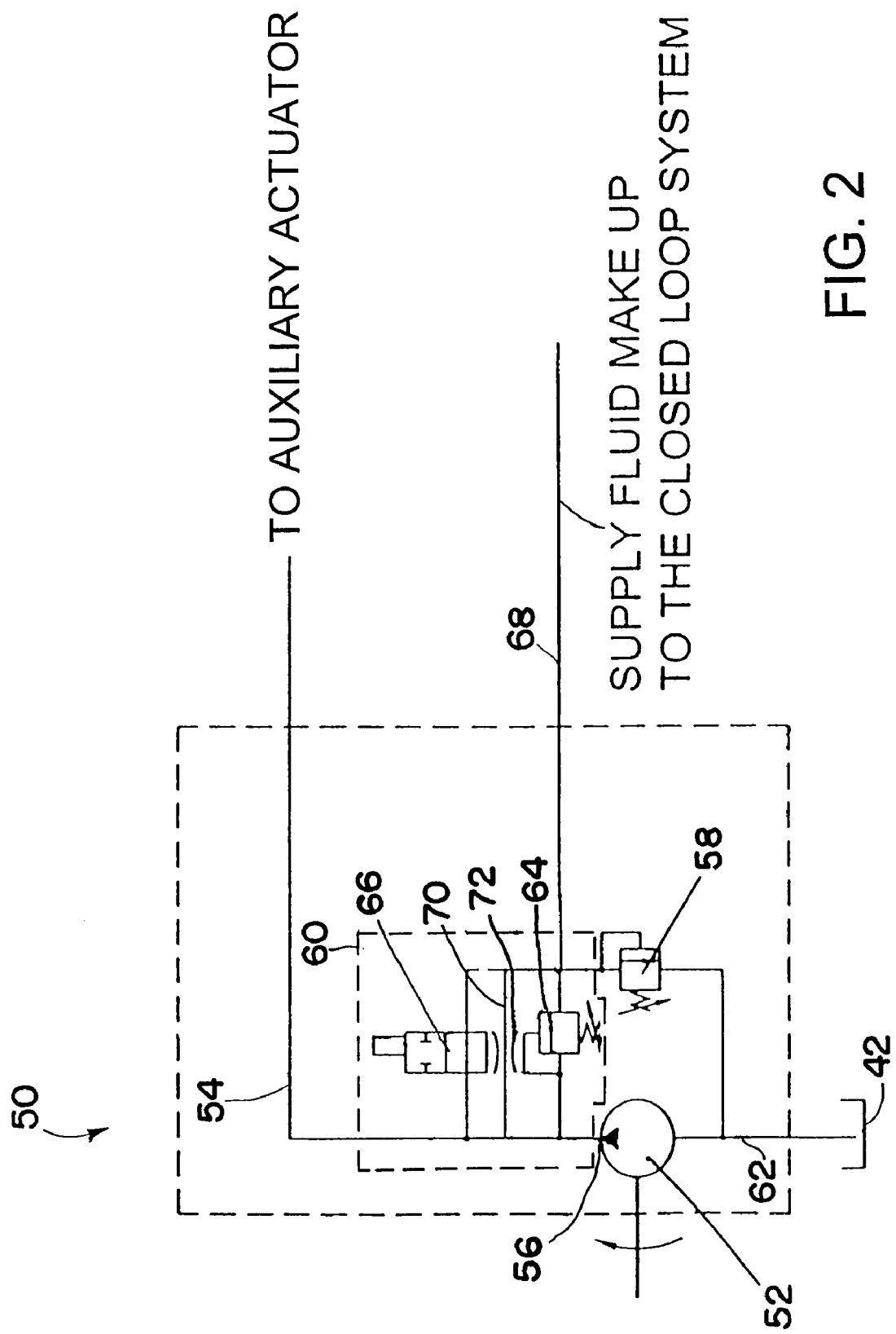
FIG. 2 is a schematic diagram illustrating an auxiliary hydraulic circuit having an auxiliary hydraulic pump assembly in accordance with the invention.

Turning now to FIG. 2, a schematic diagram is shown illustrating an auxiliary hydraulic pump assembly 50 for a hydrostatic transmission in accordance with the invention. The assembly 50 includes an auxiliary pump 52, a discharge line 54 connectable to an actuator (now shown) for supplying fluid from an outlet 56 of the pump 52 to the actuator. A low pressure relief valve 58 is connected in series with a selectively actuated flow control device 60 between the outlet 56 of the pump 52 and an inlet line 62. The low pressure relief valve 58 allows fluid to pass therethrough that is at a pressure exceeding a first pressure, for example 100 psi. The flow control device 60, which in the illustrated embodiment is a high pressure relief valve 64 connected in parallel with a bypass valve 66 between the outlet 56 and the low pressure relieve valve 58, operates in two modes of operation. In a first mode of operation, the flow control device 60 permits flow from the pump outlet 56 to the low pressure relief valve 58 when pressure of the fluid at the outlet 56 exceeds a second pressure level that is greater than the first pressure level. Thus, pressurized fluid at the outlet 56 of the auxiliary pump 52 can be supplied to the pump discharge line up to the second level of pressure. In a second mode, the flow control device 60 connects the pump outlet 56 to the low pressure relief valve 58 regardless of fluid pressure at the outlet 56 of the auxiliary pump 52. Thus, the pressure at the outlet 56 of the pump 52 will be limited by the low pressure relief valve in such second mode of the flow control device 60 and allow higher pressure fluid in the pump discharge line 54 to flow through the low pressure relief valve 58.

It will be appreciated that a makeup flow supply line 68, connected at a point between the flow control device 60 and the low pressure relief valve 58, can be connected to a charge line of a hydrostatic transmission for providing makeup flow to a closed circuit of the same. By way of example, the makeup flow supply line 68 could be connected to charge line 26 in FIG. 1. To ensure adequate makeup flow is available, an optional bypass line 70 and a restricting orifice 72 can be provided for connecting the outlet of the pump 52 to the makeup flow supply line 68. Although illustrated as part of the flow control device 60, bypass line 70 and orifice 72 can be provided separate from the flow control device 60.

In operation, the auxiliary pump assembly 50 can be used to supply fluid to an auxiliary actuator via discharge line 54 and also supply makeup flow via makeup flow supply line 68 to a closed loop of a hydrostatic transmission. Accordingly, auxiliary pump 52 is configured to move fluid into discharge line 54. In the illustrated embodiment, discharge line 54 is connectable to an auxiliary actuator as a two-way line providing for both flow and return of fluid from an auxiliary actuator. When the auxiliary actuator is operated fluid flows to the actuator via discharge line 54 while the flow control device 60 typically remains in the first mode of operation thereby permitting flow through the flow control device 60 only when pressure in discharge line 54 and/or of the outlet 56 of the pump 52 exceeds the second higher pressure. In this manner, flow control device 60 acts as safety relief valve to prevent overload of the auxiliary circuit.

When the actuator is not in use, the flow control device 60 operates in the second mode of operation thereby connecting the pump outlet 56 to the low pressure relief valve 58 regardless of fluid pressure at the outlet 56 or in the discharge line 54. This second mode of operation is achieved by opening bypass valve 66 such that fluid can flow from the outlet 56 around the high pressure relief valve 64 to the low pressure valve 58 and/or the makeup flow supply line 58 for supplying makeup flow to the closed loop of hydrostatic transmission. It will be appreciated that during operation of the pump 54, a minimum amount of the fluid flowing from the outlet 56 of the pump 54 flows through bypass line 70 and restricting orifice 72 to makeup flow supply line 68.

The configuration of the auxiliary hydraulic assembly 50 in FIG. 2 facilitates low pressure operation of the auxiliary pump 52 when the auxiliary actuator is not in use. Unlike prior art systems that typically maintained high pressure in the auxiliary circuit lines during all times, the auxiliary pump assembly 50 reduces heat generation in the auxiliary circuit by maintaining a lower operating pressure when the auxiliary actuator is not in use.

Figure 3:
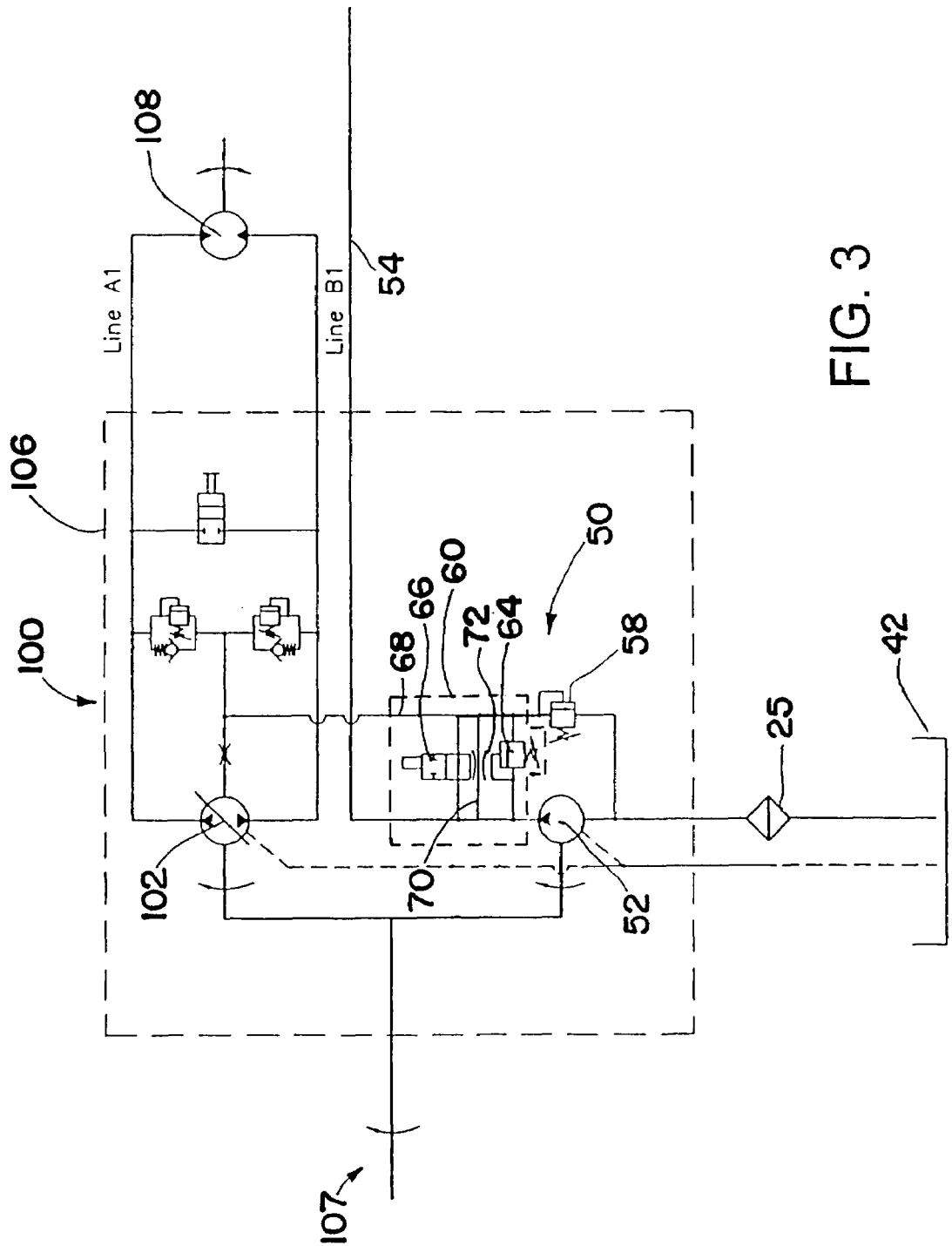
FIG. 3 is a schematic diagram illustrating a hydrostatic transmission including an auxiliary hydraulic circuit having an auxiliary hydraulic pump assembly in accordance with the invention.
Figure 4:
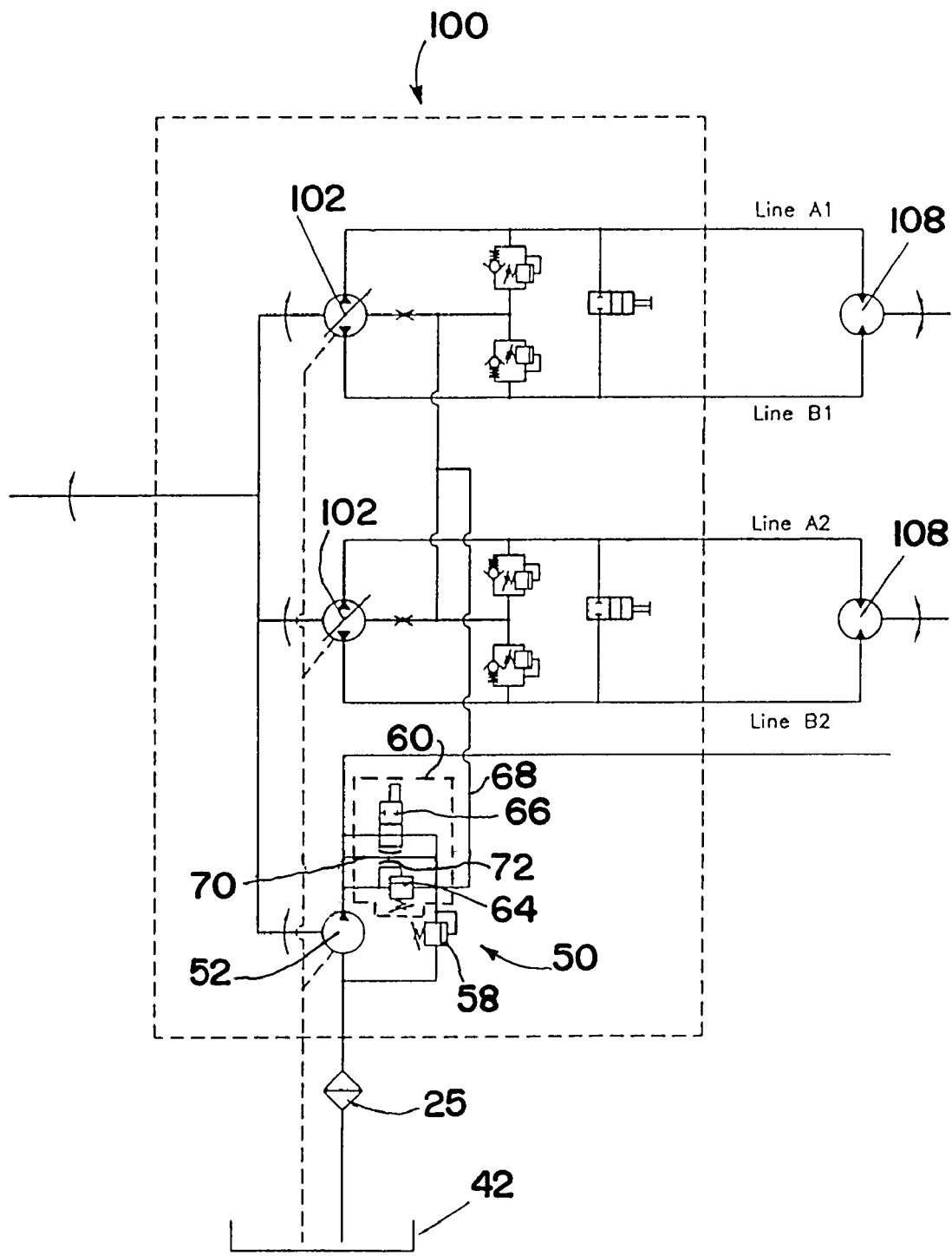
FIG. 4 is a schematic diagram illustrating another hydrostatic transmission including an auxiliary hydraulic circuit having an auxiliary hydraulic pump assembly in accordance with the invention.
Figure 5:
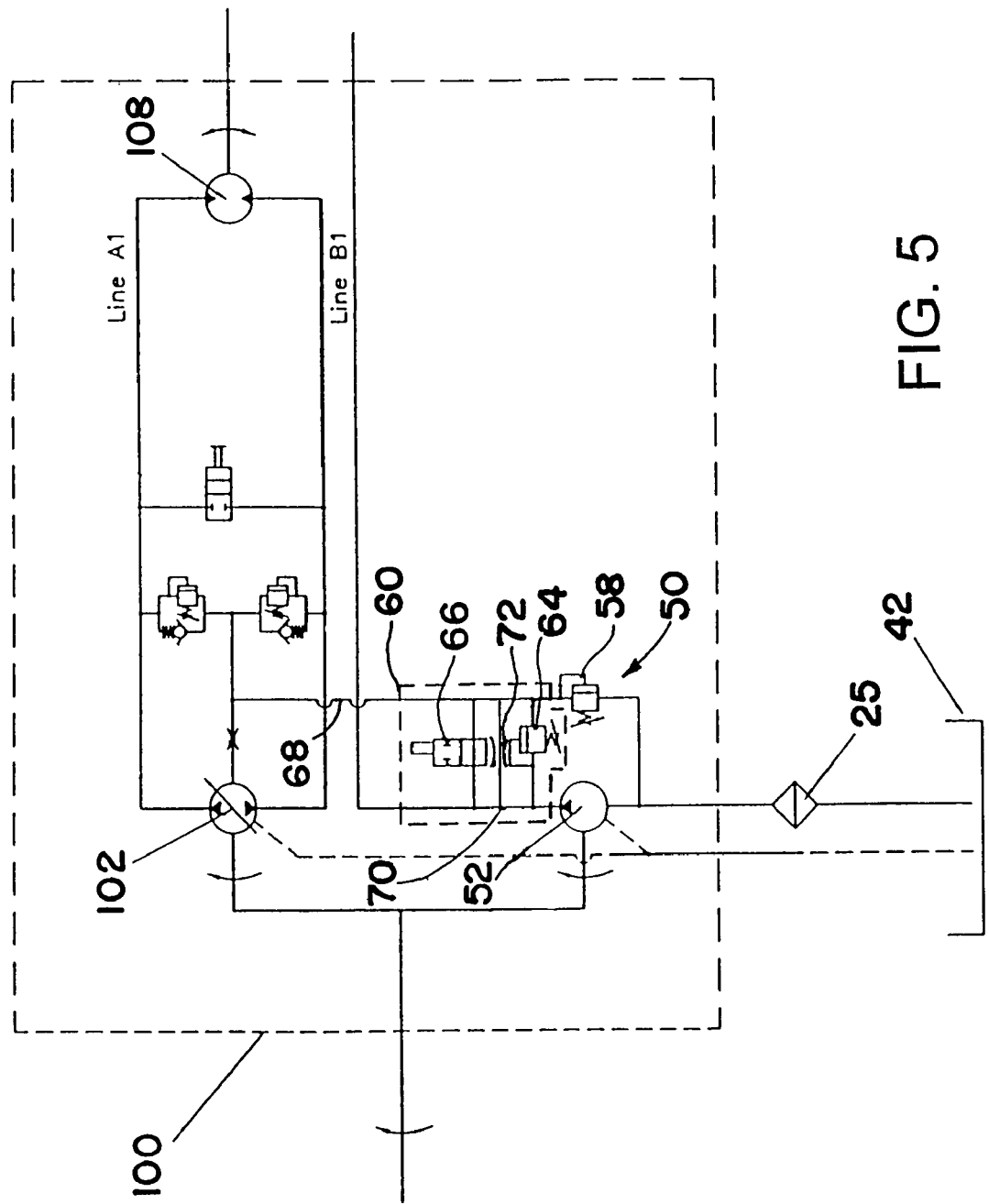
FIG. 5 is a a schematic diagram of yet another hydrostatic transmission including an auxiliary hydraulic circuit having an auxiliary hydraulic pump assembly in accordance with the invention.

Turning to FIGS. 3-5, three different hydrostatic transmissions are illustrated including the auxiliary pump assembly 50 of FIG. 2. In FIG. 3, the hydrostatic transmission 100 includes a main pump 102 and auxiliary pump assembly 50 as part of a pump unit 106. Both the main pump 102 and auxiliary pump 106 are driven by a common input 107. The main pump 102 is connected to a motor 108 via lines A and B thereby forming a closed loop. The auxiliary pump assembly 50, which is identical to the auxiliary pump assembly 50 described in FIG. 2, is connected to the closed loop for supplying makeup flow thereto in the manner previously described. Pump discharge line 54 can be connected to an auxiliary actuator, as mentioned.

In FIG. 4, hydrostatic transmission 100 includes a pump unit 106 having two closed loops, each closed loop having a pump 102 connected to a motor 108 via lines A1, B1 and A2, B2 as shown. The auxiliary pump assembly 50 is connected to each closed loop for supplying makeup flow thereto in the same manner as described in connection with FIG. 2. Pump discharge line 54 can be connected to an auxiliary actuator, as mentioned.

In FIG. 5, the hydrostatic transmission 100 is an integrated hydrostatic transmission. The hydrostatic transmission 100 includes a pump 102 connected to a motor 108 via lines A and B in a closed loop configuration. The auxiliary pump assembly 50 is connected in the manner previously described to the closed loop for providing makeup flow thereto and the discharge line 54 is provided for connection to an auxiliary actuator.

It will be appreciated that the auxiliary pump assembly 50 described herein can be used in a wide variety of hydrostatic transmission configurations for both providing makeup flow to a closed loop of the hydrostatic transmission and for providing fluid to an auxiliary circuit. Although in the illustrated embodiments, a single action actuator is used, it will be appreciated that the discharge line 54 of the auxiliary pump assembly 50 can be connected to a wide variety of actuators and, in some cases, a return line from the actuator can return flow to the auxiliary pump assembly at a suitable point, such as line 68 for supplying makeup flow to the closed loop system and/or returning fluid to the intake line 62 of the auxiliary pump 52 via low pressure relief valve 58.

Figure 6:
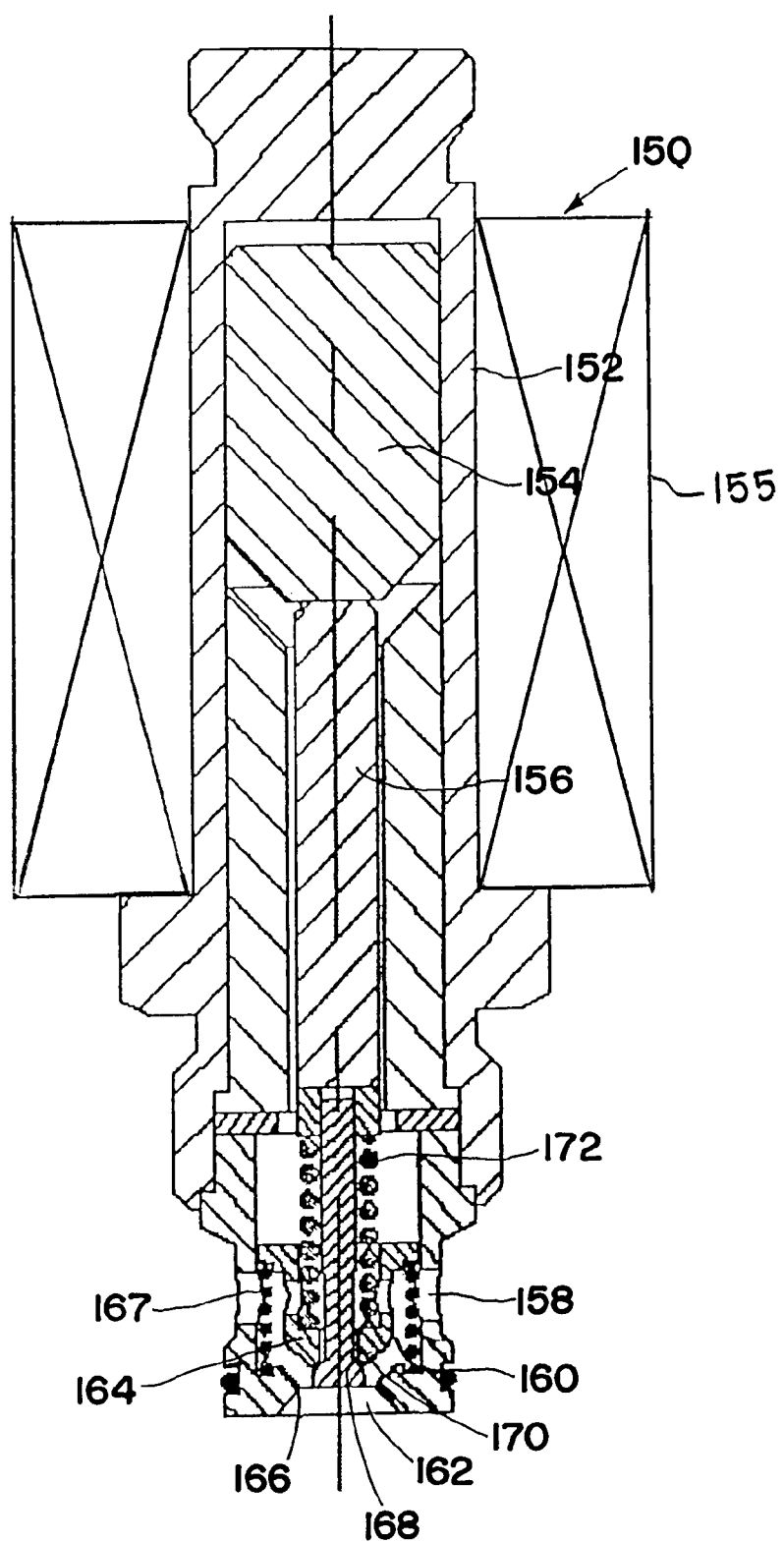
FIG. 6 is a cross-sectional view of a combination bypass and pressure relief valve including a bypass orifice in accordance with the invention.
Figure 10:
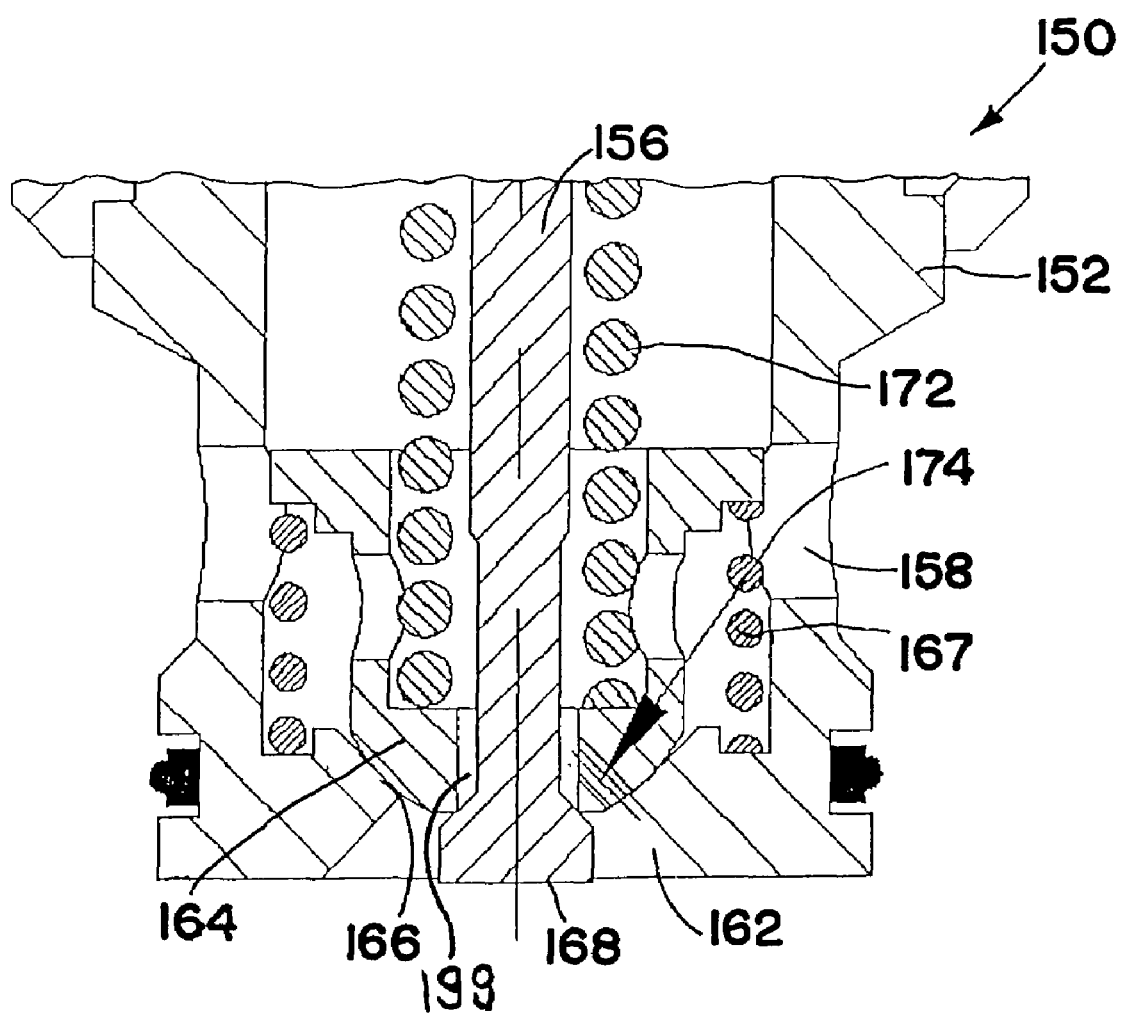
FIG. 10 is an enlarged portion of FIG. 8 illustrating a restricting orifice.

Turning to FIGS. 6-10, and initially to FIGS. 6 and 7, a combination valve 150 in accordance with the invention is illustrated. The illustrated valve 150 is a solenoid actuated valve, but any suitable actuating mechanism can be used. As will be described, the valve 150 includes a bypass valve, a relief valve, and a bypass orifice for allowing an amount of fluid to flow through the valve regardless of the state of the valve. It will be appreciated that the valve 150 can be used in the above-described auxiliary hydraulic pump assemblies as the flow control device, for example.

The valve 150 includes a valve body 152, a magnetic plunger 154, and a valve stem 156. It will be appreciated that the valve body 152 is configured to be received within a coil 155 thereby forming a solenoid. When the coil 155 is energized, the plunger 154 is forced downward thereby moving the valve stem 156 to open or close the bypass valve. In the illustrated embodiment, the valve body 152 includes a radial passageway (port) 158 connected internally via a chamber 160 to an axial passageway (port) 162. A bypass valve including a bypass valve member 164 and bypass valve seat 166 is configured to prevent flow in the internal chamber 160 when the coil 155 is energized, as will be described. The bypass valve member 164 is biased open by spring 167 thereby allowing fluid to flow from the radial port 158 (inlet) to the axial port 162 (outlet). A relief valve is provided including a relief valve member 168, which in the illustrated embodiment is supported within a relief flow passage 199 in the bypass valve member 164, and a relief valve seat portion 170 formed by a portion of the bypass valve member 164 against which the relief valve member 168 is configured to seal. Relief valve spring 172 biases the relief valve member 168 into sealing engagement with the relief valve seat portion 170 as long as the pressure of the fluid in the radial port 158 is below a prescribed amount. An orifice 174 (see FIG. 10) is provided connecting the radial port 158 to axial port 162 regardless of the states of the bypass valve 164 and relief valve 168.

Accordingly, when the valve stem 156 is in an open position and, consequently, the bypass valve is open (FIGS. 6 and 7), fluid can enter the valve 150 through the radial passageway 152 and exit through axial passageway 162. When the valve stem 156 is in a closed position (FIGS. 8-10), the bypass valve member 164 is closed thereby restricting fluid from flowing from the radial port 158 to the axial port 162 as long as the pressure of the fluid entering the radial port is less than the prescribed pressure required to open the relief valve member 168.

Turning to FIG. 9, the bypass valve member 164 is shown in the closed position. In this configuration, if the pressure of the fluid at the radial passageway 152 is greater than the prescribed pressure required to actuate the relief valve, the relief valve will open as shown thereby permitting fluid to flow from the radial passageway 158 to the axial passageway 162 via the relief passage 169.

It will be appreciated that, regardless of the positions of the bypass valve member 164 and/or relief valve member 168, fluid can flow from the radial passageway 158 to the axial passageway via the orifice 174. Accordingly, in the case of the valve 150 being installed in an auxiliary pump circuit between an outlet of a pump and a makeup flow supply line as described above with reference to FIGS. 1-5, the orifice 174 permits a minimum amount of fluid to be supplied to the makeup flow supply line. In some applications, supplying a constant minimum amount of fluid to a closed loop can be important for preventing cavitation of a pump in the closed circuit.

It will further be appreciated that the above-described valve 150, when used in an auxiliary pump assembly as described above, can function as the flow control device. Thus, when the valve 150 is open (See FIGS. 6 and 7), the valve 150 functions in accordance with the second mode of operation of the flow control device 60 connecting the pump outlet 54 to the low pressure relief valve 58 regardless of fluid pressure at the outlet 56 of the auxiliary pump 52. Thus, the pressure at the outlet 56 of the pump 52 will be limited by the low pressure relief valve. When the valve 150 is closed (see FIGS. 8-10), the valve functions in accordance with the first mode of operation of the flow control device 60 and permits flow from the pump outlet 56 to the low pressure relief valve 58 when pressure of the fluid at the outlet 56 exceeds a second pressure level that is greater than the first pressure level. Thus, pressurized fluid at the outlet 56 of the auxiliary pump 52 can be supplied to the pump discharge line up to the second level of pressure. Finally, the orifice 174 of the valve 150 functions as the orifice 72 to allow a minimum amount of fluid to flow from the pump outlet to the makeup flow supply line 68 regardless of the state of the valve 150.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An auxiliary hydraulic pump assembly for a hydrostatic transmission system for a vehicle comprising:

an auxiliary hydraulic pump having an inlet and an outlet;

a pump discharge line connectable to an actuator for supplying fluid from the outlet of the pump to the actuator; and a low pressure relief valve connected in series with a selectively actuated flow control device between the outlet of the pump and the inlet of the pump, the low pressure relief valve allowing fluid to pass therethrough that is at a pressure exceeding a first pressure level;

wherein the flow control device in a first mode of operation for when high pressure fluid is to be supplied to the actuator permits flow from the pump outlet to the low pressure relief valve when pressure of the fluid at the outlet exceeds a second pressure level greater than the first pressure level and blocks flow when the pressure of the fluid at the outlet is no greater than the second level, whereby pressurized fluid at the outlet of the auxiliary pump can be supplied to the pump discharge line up to the second level, and in a second mode of operation for when high pressure fluid is not to be supplied to the actuator connects the pump outlet to the low pressure relief valve regardless of fluid pressure at the outlet of the auxiliary pump, whereby pressure at the outlet of the pump will be limited by the low pressure relief valve in such second mode of the flow control device and allow higher pressure fluid in the pump discharge line to flow through the low pressure relief valve; and wherein the flow control device is a relief valve that is selectively openable whereby when the relief valve is selectively opened fluid can flow from the outlet of the to the low pressure relief valve regardless of fluid pressure.

2. An auxiliary hydraulic pump assembly as set forth in claim 1, wherein the flow control device comprises a high pressure relief valve and a bypass valve connected in parallel, whereby when the bypass valve is closed the flow control device permits flow from the pump outlet to the low pressure relief valve when pressure of the fluid at the outlet exceeds a second pressure level greater than the first pressure level and blocks flow when the pressure of the fluid at the outlet is no greater than the second level, whereby pressurized fluid at the outlet of the auxiliary pump can be supplied to the pump discharge line up to the second level, and when the bypass valve is open the flow control device connects the pump outlet to the low pressure relief valve regardless of fluid pressure whereby pressure at the outlet of the pump will be limited by the low pressure relief valve in such second mode of the flow control device and allow higher pressure fluid in the pump discharge line to flow through the low pressure relief valve.

3. An auxiliary hydraulic pump assembly as set forth in claim 1, wherein an outlet of the flow control device is connectable to a charge line for providing make-up flow to the hydrostatic transmission.

4. An auxiliary hydraulic pump assembly as set forth in claim 1, wherein the flow control device is adjacent the pump.

5. An auxiliary hydraulic pump assembly as set forth in claim 1, wherein the flow control device is integral with the pump.

6. An auxiliary hydraulic pump assembly as set forth in claim 1, wherein the pump includes a pump housing, and the flow control device is located within the confines of the housing.

7. A hydrostatic transmission including a pump, a motor, supply and return lines connecting the pump and motor in a closed circuit, and the auxiliary pump assembly as set forth in claim 1, wherein of the flow control device of the auxiliary hydraulic pump assembly is connected to a charge line of the hydrostatic transmission for providing makeup flow to the closed circuit.

8. A hydrostatic transmission as set forth in claim 7, wherein the hydrostatic transmission includes a housing, and the auxiliary pump and flow control device are located within the confines of the housing.

9. An auxiliary hydraulic pump assembly for a hydrostatic transmission system for a vehicle comprising:
an auxiliary hydraulic pump having an inlet and an outlet;
a pump discharge line connectable to an actuator for supplying fluid from the outlet of the pump to the actuator; and
a low pressure relief valve connected in series with a selectively actuated flow control device between the outlet of the pump and the inlet of the pump, the low pressure relief valve allowing fluid to pass therethrough that is at a pressure exceeding a first pressure level;
wherein the flow control device in a first mode of operation for when high pressure fluid is to be supplied to the actuator permits flow from the pump outlet to the low pressure relief valve when pressure of the fluid at the outlet exceeds a second pressure level greater than the first pressure level and blocks flow when the pressure of the fluid at the outlet is no greater than the second level, whereby pressurized fluid at the outlet of the auxiliary pump can be supplied to the pump discharged line up to the second level, and in a second mode of operation for when high pressure fluid is not to be supplied to the actuator connects the pump outlet to the low pressure relief valve regardless of fluid pressure at the outlet of the auxiliary pump, whereby pressure at the outlet of the pump will be limited by the low pressure relief valve in such second mode of the flow control device and allow higher pressure fluid in the pump discharge line to flow through the low pressure relief valve, and a bypass restricting orifice for bypassing the flow control device and allowing a minimum amount of fluid to flow from the pump outlet to the low pressure relief valve.

10. A valve for use in an auxiliary hydraulic circuit of a hydrostatic transmission comprising:
a valve body having an inlet and an outlet connected by an interior chamber;
a bypass valve member supported in the valve body for axial movement between open and closed positions respectively permitting and restricting flow of a fluid from the inlet to the outlet; and
a relief valve member for permitting flow between the inlet and outlet via a relief passage in response to fluid pressure at the inlet exceeding a prescribed level when the bypass valve member is in the closed position.

11. A valve as set forth in claim 10, wherein the relief valve member forms a portion of the bypass valve member.

12. A valve as set forth in claim 10, further comprising a flow restricting orifice connecting the inlet to the outlet for permitting a minimum flow between the inlet and the outlet regardless of the position of the bypass valve member.

13. A valve as set forth in claim 10, wherein the flow restricting orifice is formed integrally with at least one of the bypass valve member and the relief valve member.

14. An auxiliary hydraulic circuit including a pump, an actuator, and a valve as set forth in claim 10 connected between an outlet of the pump and an inlet of the pump.

15. A method of operating an auxiliary pump assembly for controlling an auxiliary component of a vehicle, comprising the steps of switching a flow control device to operate in a first mode for supplying high pressure fluid to the auxiliary component that permits flow from a pump outlet to a low pressure relief valve when pressure of the fluid at the outlet exceeds a prescribed pressure level and blocks flow when the pressure of the fluid at the outlet is no greater than the prescribed pressure level, whereby pressurized fluid at the outlet of the pump can be supplied to a pump discharge line up to the prescribed pressure level, and switching the flow control device to operate in a second mode when high pressure fluid is not to be supplied to the auxiliary component that connects the pump outlet to the low pressure relief valve regardless of fluid pressure at the outlet of the auxiliary pump, whereby pressure at the outlet of the pump will be limited by the low pressure relief valve in such second mode of the flow control device and allow higher pressure fluid in the pump discharge line to flow through the low pressure relief valve; wherein the flow control device is a relief valve that is selectively openable whereby when the relief valve is selectively opened fluid can flow from the outlet of the pump to the low pressure relief valve regardless of fluid pressure.

* * * * *

UNITED STATES PATENT AND TRADEMARK OFFICE
CERTIFICATE OF CORRECTION

PATENT NO. : 7,640,735 B2  
APPLICATION NO. : 11/533121  
DATED : January 5, 2010  
INVENTOR(S) : Jerome B. Wuthrich et al.

Page 1 of 1

It is certified that error appears in the above-identified patent and that said Letters Patent is hereby corrected as shown below:

In the Claims:

Claim 1 at column 9, lines 1 & 2:
"selectively opened fluid can flow from the outlet of the to the low pressure relief valve regardless of fluid pressure." should read:
-- selectively opened fluid can flow from the outlet of the pump to the low pressure relief valve regardless of fluid pressure. --

Signed and Sealed this  
Seventh Day of May, 2013

Teresa Stanek Rea  
*Acting Director of the United States Patent and Trademark Office*